United States Patent
Damron et al.

Patent Number: 5,920,127
Date of Patent: Jul. 6, 1999

[54] PROPELLER WIND CHARGING SYSTEM FOR ELECTRICAL VEHICLE

[76] Inventors: Philip C. Damron; Jane L. Damron, both of 1611 Edwin Ave., Woodland, Calif. 95695

[21] Appl. No.: 08/906,166

[22] Filed: Aug. 5, 1997

Related U.S. Application Data

[63] Continuation-in-part of application No. 08/699,504, Aug. 19, 1996, abandoned.

[51] Int. Cl.⁶ ........................................ B60K 1/00
[52] U.S. Cl. ............................. 290/44; 290/55; 180/65.3
[58] Field of Search ........................ 290/44, 55; 322/35; 180/65.3

[56] References Cited

U.S. PATENT DOCUMENTS

| | | | |
|---|---|---|---|
| 2,148,804 | 2/1939 | Claytor | 290/44 |
| 3,621,930 | 11/1971 | Dutchak | 180/65 R |
| 3,876,925 | 4/1975 | Stoeckert | 322/1 |
| 4,132,282 | 1/1979 | Sparks | 180/65 DD |
| 4,141,425 | 2/1979 | Treat | 180/65 DD |
| 4,179,007 | 12/1979 | Howe | 180/65 DD |
| 4,254,843 | 3/1981 | Han et al. | 180/165 |
| 4,314,160 | 2/1982 | Boodman et al. | 290/55 |
| 5,563,451 | 10/1996 | Furukawa | 307/10.1 |

Primary Examiner—Nestor Ramirez
Assistant Examiner—Nicholas Ponomarenko
Attorney, Agent, or Firm—William S Bernheim

[57] ABSTRACT

This invention relates to a multibladed (three or more) small diameter propeller as being included in an apparatus consisting of the single unenclosed propeller, extention shaft, armature shaft, and generator; such apparatus to be mounted on top of an electric vehicle to transform wind energy into electrical energy for feeding such energy into the battery pack as the vehicle is being driven forward; such energy to augment the stored voltage potential of the battery pack.

4 Claims, 1 Drawing Sheet

PROPELLER WIND CHARGING SYSTEM FOR ELECTRICAL VEHICLE

RELATED APPLICATION

This application is a continuation-in-part of application Ser. No. 08/699,504 filed on Aug. 19, 1996, now abandoned.

BACKGROUND OF THE INVENTION

1. Field of the Invention

This invention relates to mounting an unenclosed multibladed (three or more) small diameter propeller driven high output generator on a electrical vehicle allowing wind to activate the propeller, providing rotational force to an armature shaft of the generator, which provides electric energy to the battery pack while the vehicle is being driven in a forward direction; such energy providing a charging mode to increase the stored voltage potential of the battery pack.

2. Description of the Prior Art

During the past century vehicles have been primarily powered by gasoline engines. More recently, electric vehicles (EV) have been gaining acceptance. EVs have a battery pack which frequently have as many as twenty-six batteries that are used to power the electric motor. These batteries need to be periodically recharged after relatively short mileage runs, because they become depleted of energy, while using their stored charge. At present, batteries can only be recharged at plug-in stationary sites where 110/220 line voltage is available. This finite amount of energy storage is the major drawback of electric vehicles.

Wind has been used to generate electric power. But to date, man's efforts to use the wind as an energy source to charge the batteries while a vehicle is moving forward have failed. Various efforts have not been successful because of complexity of equipment and design, Han #4,254.843 and Dutchak #3,621.930.

The prior art has also failed to appreciate the difference between closed and unenclosed systems. Boodman $4,134.160, Howe #4,170.007, Sparks #4,132.384, Stoechert #3,876.925, Treat #4,141.425, Dutchak #3,621.930 and Han #4,254.843 are all examples of closed systems.

The prior art does not teach multibladed small diameter propellers. Claytor #2,148.804 is the only example of an open propeller system, however Claytor fails to show any connection to a moving EV and is limited by a two bladed propeller.

OBJECTS OF THE INVENTION

Accordingly, the major object of this invention is to provide electric vehicles with a practical system that will provide energy to the battery pack while the vehicle is being driven by using an energy conversion system based upon an unenclosed multibladed (three or more) small diameter propeller actuated high output generator.

Another object is to enhance electric vehicle range by cycling and thereby adding the wind generated energy into the power pack while the vehicle is being driven.

Other objectives, advantages and novel features of the invention will become apparent to those skilled in the art upon examination of the invention and the accompanying drawings.

SUMMARY OF THE INVENTION

BRIEF DESCRIPTION OF THE FIGURES

The following detailed description, taken in conjunction with the accompanying drawings, illustrates a preferred embodiment of the invention. The drawings are.

DETAILED DESCRIPTION OF A PREFERRED EMBODIMENT

Figure 1:
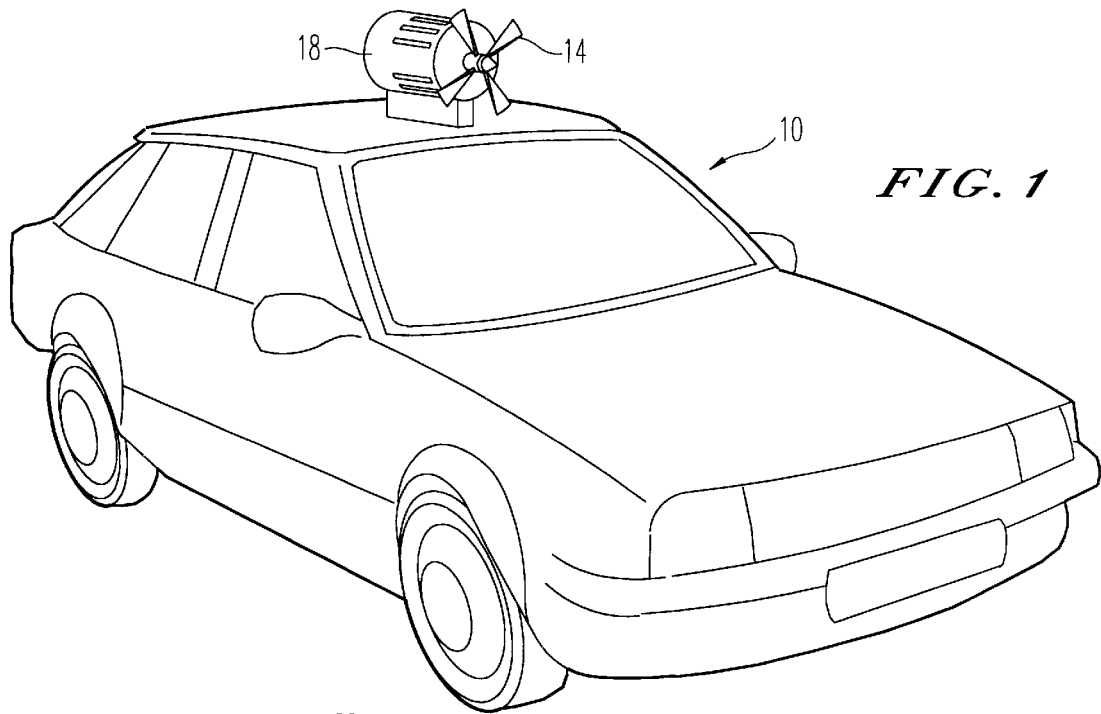
FIG. 1 shows a generator with an axially mounted four bladed propeller in accordance with the invention on an electric vehicle.

An electric car 10 is shown in the figures with an apparatus for capturing energy from the wind and converting such energy into electric energy. The apparatus consists of a multibladed (three or more) small diameter propeller 14, an extension shaft 16, a high output generator 18, a regulator means 20, rectifiers 22 and a battery pack 24. The generator 18 includes as part thereof a centrally located armature shaft 26 on which shaft 16 extends and provides means by which the propeller 14 is mounted on a common axle with shaft 26. The high output generator 18 is mounted on the roof of the electric car 10. The regulator means 20, rectifiers 22 and the battery pack are wired to the high output generator 18 so that rectifiers 22 deliver direct current to the battery pack 24. The regulator means 20 prevents overcharging of the battery pack 24. An appropriate battery pack 24 consists of a number, such as 26 or 29 of 12-volt batteries wired in series to generate high voltages. Placement of the regulator means 20, rectifiers 22, and battery pack 24 is not critical and these parts can be located in or on the vehicle at any convenient location.

The high output generator is mounted to have the multibladed propeller 14 facing forward to take advantage of the air flow. The forward motion of the vehicle produces a more constant and steady air flow (energy source) than rotating the entire roof mounted apparatus consisting of the propeller 14, extension shaft 16, armature shaft 26 and generator 18 into a prevailing wind.

Figure 2:
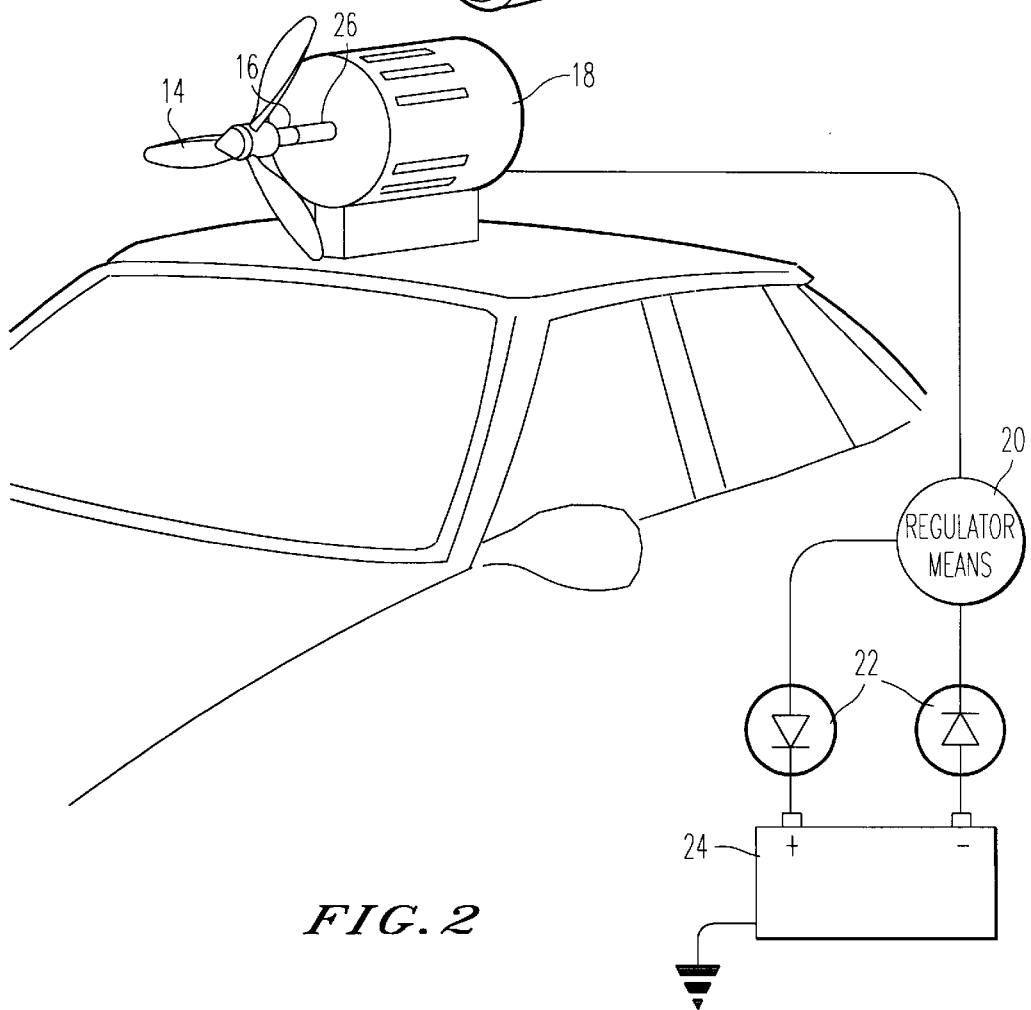
FIG. 2 is a schematic side view of a three bladed propeller in accordance with the invention mounted on a electric vehicle.

FIG. 2 is intended to show the wind charging system and does not attempt to show the complete EV with the electric drive motor. It is obvious to anyone skilled in the art that the battery pack is connected to the electric drive motor within the complete EV.

As the vehicle is driven forward, artificial wind conditions occur on top of the vehicle resulting from combining the natural wind conditions and the speed of the vehicle. Such conditions are referred to a wind drag. Wind drag of vehicles is not proportional to speed but increases much more rapidly. Wind drag to a vehicle is power to a propeller. Any electrical vehicle moving forward will have drag with or without a generator, shaft, and propeller mounted on top of the vehicle. The placement of the generator with propeller on top of the vehicle adds little to the drag, but allows a large gain in terms of the energy captured by the propeller, because power to a wind driven propeller is proportional to the cube of the wind velocity. For example, an increase in wind velocity for 11 mph to 14 mph almost doubles the available power.

The energy transferring system based on the use of a multibladed propeller driven high voltage/high amperage/high wattage generator is significantly more efficient than vanes at capturing and transferring energy at the low mph speeds used in vehicular travel. Vaned systems are relatively non productive at low revolutions per minute because vanes are flat on both the top and bottom surface, but a propeller is an airfoil, aerodynamically similar to a wing. The surface on the top of the propeller blade or a wing is curved and the surface on the bottom of the propeller blade or a wing is flat. This curvature turns the blade/propeller into an airfoil/wing.

A well designed propeller can translate wind power to a rotational torque on the generator's main shaft at approximately 85% efficiency because the wind is forced to move in a longer path over the curved surface than over the flat surface, therefore velocity is increased. This is known as the Bernoulli Principle. A propeller is an airfoil aerodynamically similar to a wing—twisted to describe in a helical path as the vehicle moves.

An appropriate propeller will be multibladed and not be enclosed in a tube or otherwise. An enclosure will have a negative effect on operating efficiency.

A propeller translates wind energy to rotational torque directly related to the total blade area, i.e. more blades equal more torque. By necessity a propeller attached to the roof of an EV will have size limitations, therefore a small diameter propeller is required. For that reason, multibladed propellers prove to be more efficient that a two bladed propeller. Two blades on a propeller do not contain enough surface area on the blades to achieve efficient energy transfer. Multiple blades on the propeller contains a greater surface area on the blades allowing a small diameter propeller to be effective. More surface area on blades enable the propeller to move larger amounts of wind, providing more rotational torque on the generator shaft. Multiple bladed propellers are the solution to effective energy transfer on any propeller wind charging system for electric vehicles.

There is another factor. The car's body acts as an airfoil. The upper body of the automobile is curved relative to the flat lower surface of the vehicle, thus as the vehicle moves forward, an increased velocity of wind moves over the top surface. It is apparent to the inventors that this factor adds to the efficiency of a roof mounted propeller.

Another advantage to this concept is that it can be applied to all electric vehicles from two-wheeled bikes to eighteen wheeled semi-trailers or to electric trains riding on rails.

A road test was devised an run to verify the advantages of the invention. An electric vehicles, a converted pick-up truck, was equipped with a battery package of 10 deep discharge lead acid batteries of 12 volts connected in series to produce 120 volt output. The drive motor was a 75 volt series electric motor rated at 400 amperes. The generator produces 6500 watts, 120/240 volts AC with 54.2/27.1 amps. A three bladed 15-inch diameter propeller was mounted on the axle of the generator.

Data was gathered under similar conditions. The source was rectangular 12.5 miles in length. Driving was at speeds 45 and 50 except at turns and stops signs. Winds were calm and the temperature 80°. The instrumentation was an E-meter with two reads outs. One is a digital read out of amperes hours beginning with "O" and progressing with minus numbers as ampere hours were consumed. Second is a four light system reflecting the amount of charge remaining in the batteries. The system is fully charged when all the lights are "on", four lights indicating a 100% charge. When one single light remains "on", only 19% of the charge remains. Two circuits of the test course were run. The first without the generator connected to the battery pack and the second with the generator attached.

On the first disconnected run, the initial digital reading was O and ended at −38. Only one light remained lit indicating a 19% charge. On the second connected run, the initial digital reading was O and ended at −30. Two lights remained lit indicating a 59% charge remained. It is concluded that the wind charger system improved the state of charge remaining in the batteries by 40%, thus adding to the stored voltage potential of the battery pack.

We claim:

1. A wind generator system comprising:

an electrical vehicle as a platform for mounting said wind generator system;

an unenclosed alternator mounted on a roof of said vehicle;

an unenclosed three-bladed propeller connected to said alternator shaft to face forward only and to provide a torque to said alternator shaft during an air movement created by said vehicle movement;

a battery charging system consisting of a voltage regulator, a two diode rectifier, and a battery pack;

where said two diode rectifier converts alternating current output from said alternator into direct current input to charge said battery pack;

where said voltage regulator prevents said battery pack overcharging; and where said battery pack energy is utilized by said electrical vehicle.

2. A wind generator system according to claim 1, wherein said propeller has more than three blades.

3. A wind generator system according to claim 1, wherein said battery charging system components are located inside the vehicle.

4. A wind generator system according to claim 1, wherein said alternator is a 120/240 volts AC alternator with 54.2/27.1 amperes output.

* * * * *